United States Patent [19]

Greenway

[11] Patent Number: 5,649,349
[45] Date of Patent: Jul. 22, 1997

[54] METHOD FOR MANUFACTURING OF LAMINATED COMPONENTS

[76] Inventor: Glenn W. Greenway, 338 Elmwood - Apartment 4, Clawson, Mich. 48017

[21] Appl. No.: 435,331

[22] Filed: May 5, 1995

[51] Int. Cl.$^6$ ............................................. H02K 15/02
[52] U.S. Cl. ........................ 29/598; 29/609; 29/732; 29/738; 310/42; 310/216
[58] Field of Search ........................... 29/598, 609, 596, 29/732, 738, 564.2, 564.6; 310/42, 216

[56] References Cited

U.S. PATENT DOCUMENTS 3,110,831 11/1963 Zimmerle.
4,445,272 5/1984 Bruhn et al..
4,619,028 10/1986 Neuenschwander.

*Primary Examiner*—Carl E. Hall
*Attorney, Agent, or Firm*—Reising, Ethington, Barnard & Perry, PLLC

[57] ABSTRACT

A method and apparatus for manufacturing laminated rotor cores in which lamina thickness variations are compensated for without disturbing the relative alignment of lamina shaft holes throughout the rotor core. The rotor core includes several truing laminas which are rotated to compensate for the lamina thickness variations and which include a central opening larger than the lamina shaft holes. The enlarged central opening in the truing laminas prevents overlap between the central opening and the shaft holes after rotation in spite of a lack of concentricity of the lamina shaft holes and central openings with respect to the laminas.

12 Claims, 5 Drawing Sheets

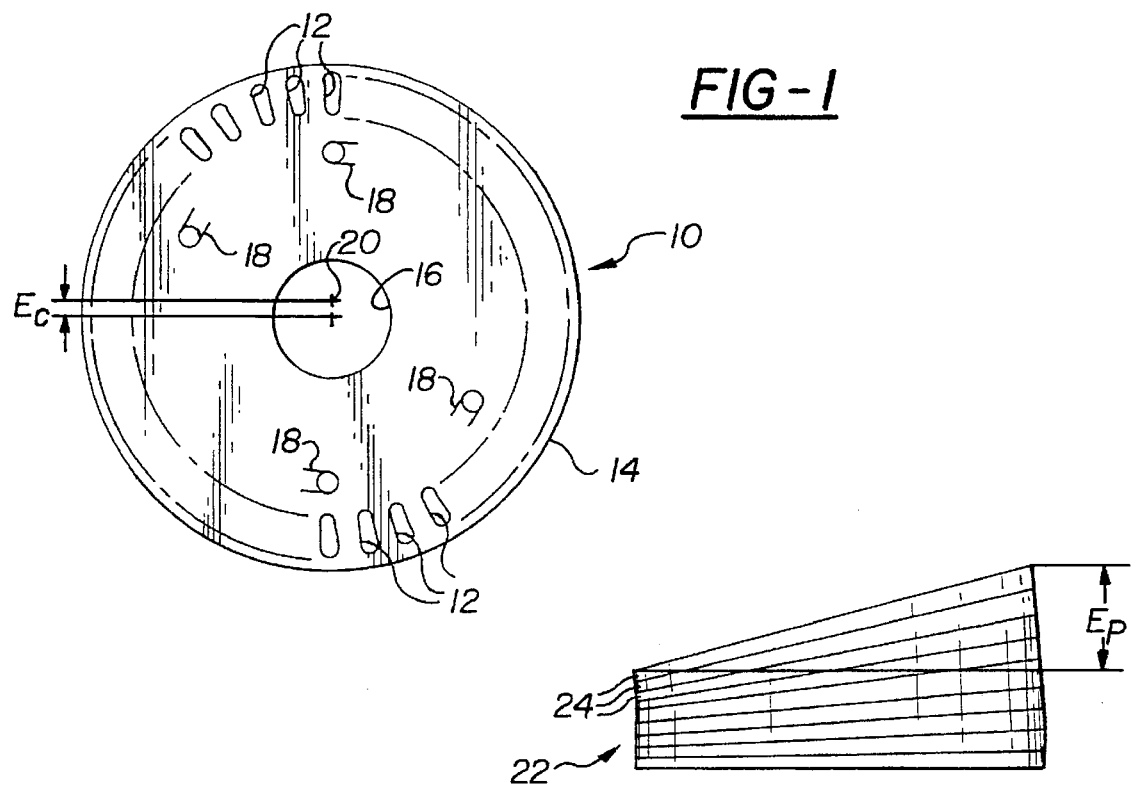
FIG-1
FIG-2
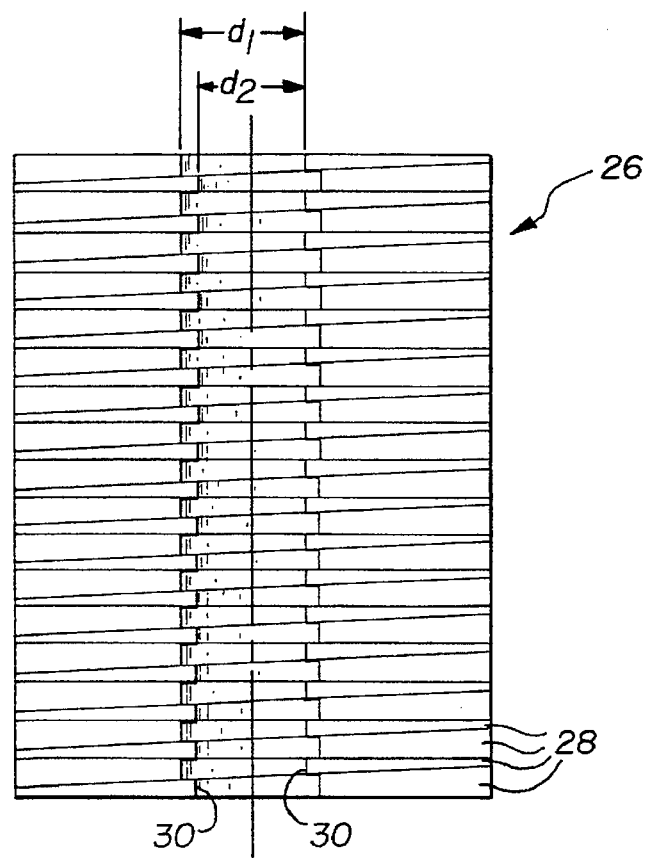
FIG-3

METHOD FOR MANUFACTURING OF LAMINATED COMPONENTS

TECHNICAL FIELD

The subject invention generally relates to metal stamping and, more particularly, to the formation of laminated components utilizing progressive die assemblies.

BACKGROUND OF THE INVENTION

The art of manufacturing laminated components, such as rotor cores, is well known in the electric motor industry. Generally, laminas are blanked from successive regions of a sheet metal strip by a progressive die assembly which includes several stations at which numerous operations are performed on the laminas. For example, the die assembly includes stations for punching numerous holes through the laminas, blanking the laminas, stacking the laminas, and interlocking the laminas into a solid core. Unfortunately, the sheet metal often includes a non-uniform thickness such that, when the laminas are stacked together in the same orientation, the thickness discrepancies accumulate to create a "parallelism" error. In other words, the thick portion of each lamina will be placed in the same position in the stack such that one side of the stack will be larger than the other, causing the stack to tilt or lean in the direction of the thin portion of each lamina.

One solution to this problem is to provide relative rotations between laminas in the stack to thereby distribute any thickness variations evenly about the stack. For example, U.S. Pat. No. 4,445,272 to Bruhn et al. discloses a method and apparatus for constructing a laminated rotor in which laminas are rotated a large increment, such as 90°, to evenly distribute any thickness variations in the sheet stock throughout the rotor core. In addition, U.S. Pat. No. 4,619,028 to Neuenschwander discloses a method and apparatus for manufacturing laminated rotor and stator cores in which the thickness of the sheet stock is measured to determine the appropriate degree of rotational correction necessary to compensate for any thickness deviations. Based upon the measured thickness deviation and other information, a rotational correction is imposed upon at least one of the laminas within the stack to compensate for the thickness variations. If desired, a small skew angle of rotation can be applied to each lamina in the stack in addition to any rotational corrections. The rotational corrections can also be applied to a rotor core having a counterbore and can be made to any lamina in the counterbore or at the juncture between the counterbore and shaft-hole segments of the rotor core.

A significant problem with rotating the laminas by a large increment is that the central shaft hole in each lamina is often not precisely concentric or in the center of each lamina. As such, when adjacent laminas are relatively rotated by a large angle, the shaft holes will be misaligned and will overlap due to the lack of concentricity. The effective size of the shaft hole will be reduced by a variable amount depending on the severity of the concentricity problem. The close tolerances necessary within the shaft hole are thus impossible to maintain, making rotation of the laminas within the stack impractical and undesirable.

SUMMARY OF THE INVENTION

In accordance with this invention, a method is provided for manufacturing laminated components from a plurality of laminas stamped out of successive regions of a sheet metal strip. The method includes blanking a plurality of standard laminas from the sheet metal strip, punching a first central opening through a first standard lamina, punching a second central opening through a second standard lamina, and blanking a first truing lamina from the sheet metal strip. A central truing opening is punched through the first truing lamina having a defined area greater than the defined area of the first central opening and unequal to the defined area of the second central opening. The standard laminas and truing laminas are stacked together in a lamina stack such that each standard lamina has a uniform rotational relationship with respect to adjacent standard laminas in the lamina stack. The first truing lamina is positioned between the first and second standard laminas in the lamina stack, and a compensating rotation is provided to the first truing lamina with respect to an immediately preceding lamina in the lamina stack such that the first truing lamina has a rotational relationship with the preceding lamina greater than the uniform rotational relationship between adjacent standard laminas to compensate for lamina thickness variations.

Further, in accordance with this invention, a method is provided for manufacturing laminated components from a plurality of laminas stamped out of successive regions of a sheet metal strip. The method includes the steps of blanking a plurality of standard laminas from the sheet metal strip, punching a first central opening through a first standard lamina, punching a second central opening through a second standard lamina, and blanking a group of truing laminas from the sheet metal strip including at least a first truing lamina. A central truing opening is punched through each lamina in the group of truing laminas having a defined area greater than the defined area of the first central opening and unequal to the defined area of the second central opening. The first standard lamina is placed upon a lamina holder, and the group of truing laminations is stacked on the lamina holder above and immediately adjacent the first standard lamina. The second standard lamina is then placed on the lamina holder above and immediately adjacent the group of truing laminas. A plurality of compensating rotations are provided to the lamina holder after placing the first standard lamina on the holder and before placing the second standard lamina on the lamina holder such that the sum of the compensating rotations is equal to a multiple of 360° to compensate for lamina thickness variations without affecting the relative angular positions of the first and second standard laminas.

Further, in accordance with this invention, an apparatus is provided for stamping a plurality of laminas from successive regions of a sheet metal strip for use in forming laminated components. The apparatus comprises a blanking punch for blanking standard laminas and truing laminas from the sheet metal strip, a first central punch for punching a first central opening through selected standard laminas, a truing hole punch for punching a central truing opening within the truing laminas smaller than the first central opening formed by the first central punch, and a lamina holder. A controller is provided for directing the die to stack first and second standard laminas on opposite ends of and immediately adjacent a group of truing laminas on the lamina holder and for directing the lamina holder to perform a plurality of compensating rotations after the first standard lamina is placed on the lamina holder and before the second standard lamina is placed on the lamina holder such that the sum of all of the compensating rotations is equal to a multiple of 360° to compensate for lamina thickness variations without affecting the relative rotational positions of the first and second standard laminas.

In accordance with the invention, lamina thickness variations are compensated for by the rotation of the truing laminas. However, the enlarged central truing openings in the truing laminas prevent overlap between the central truing openings in the truing laminas and the central openings in the standard laminas. Because the standard laminas are not rotated to a large degree, the central openings therein remain aligned throughout the rotor core.

DESCRIPTION OF THE DRAWINGS

FIG. 1 shows a rotor lamination of the prior art;

FIG. 2 is an exaggerated cross-sectional view of a rotor core of the prior art;

FIG. 3 shows a cross section of a second exaggerated rotor core of the prior art;

BEST MODE FOR CARRYING OUT THE INVENTION

Figure 4:
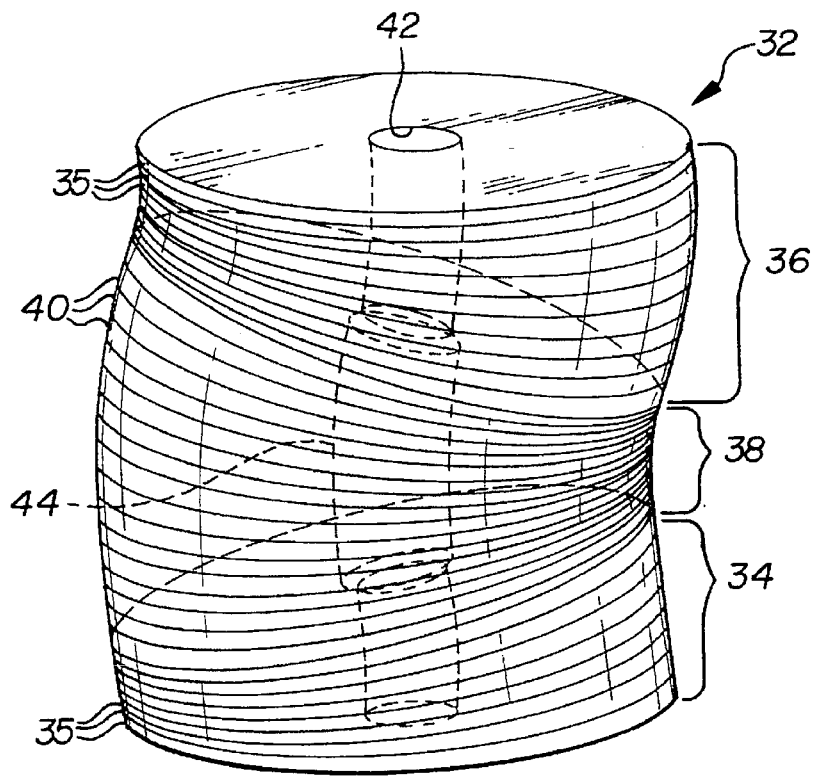
FIG. 4 shows a rotor core manufactured in accordance with the present invention.

Referring now to the drawings, there is shown an illustrative embodiment of this invention in a method and apparatus for making rotor laminations in progressive stamping dies which compensate for lamina thickness variations while maintaining the alignment of shaft holes within the laminas. It will be appreciated, as the description proceeds, that the invention may be used for making a wide variety of laminated components in which the lamina thickness variations are at least partially compensated for. Further, it will be appreciated that the invention may be realized in a wide variety of embodiments.

FIG. 1 illustrates a rotor lamination 10 manufactured from a progressive stamping die in accordance with the prior art. The rotor lamination 10 is circular and includes a plurality of teardrop-shaped slots 12 disposed radially about the outer periphery 14 of the rotor lamination 10. A central opening 16 is disposed through the rotor lamination 10, and a plurality of interlock tabs 18 is provided for joining adjacent rotor laminations 10 together when stacking the laminations into a rotor core. Due to manufacturing tolerances within the dies of the prior art, the central opening 16 is often not disposed at the precise center 20 of the rotor lamination but is offset by a small concentricity error $E_c$.

FIG. 2 illustrates a cross sectional view of an exaggerated rotor core 22 manufactured in accordance with the prior art. The core includes a plurality of rotor laminations 24 which are stamped from successive regions of a continuous strip of sheet metal. As such, thickness variations in the sheet metal will result in a non-uniform thickness within the rotor laminations 24. During the stacking process of the rotor laminations 24 to form the rotor core 22, the rotor laminations 24 are stacked with the same relative angular orientation with respect to each adjacent lamination 24 causing the lamina thickness variations to be located at the same positions within the lamina stack. This will result in an accumulation of the thickness deviations and a total parallelism error $E_p$. If significant, the parallelism error $E_p$ can cause severe problems in the performance of the rotor core 22. The parallelism error $E_p$ has been exaggerated in FIG. 2 from the amount traditionally encountered.

FIG. 3 illustrates a cross sectional view of a second rotor core 26 of the prior art in which individual laminas 28 are relatively rotated to distribute any lamina thickness variations throughout the rotor core 26. In FIG. 3, every other lamina is rotated by 180° to eliminate or significantly reduce any parallelism error in the rotor core 26. However, the central opening or shaft hole 20 in each lamina 28 is frequently not precisely concentric within the lamina 28. Thus, rotation of the laminas 28 will cause an overlap of the shaft holes 30 and an effective reduction in the shaft hole size throughout the lamina stack. For example, if the shaft hole 30 in each lamina 28 has a diameter of $d_1$, the overlapping shaft holes 30 can result in an effective diameter of the shaft hole 30 throughout the rotor core 26 of only $d_2$.

It has been discovered, in accordance with this invention, that the effective reduction in the shaft hole size throughout the rotor core can be avoided by providing a plurality of truing laminations within the lamina stack. In the preferred embodiment of the invention, the truing laminas are disposed within the lamina stack between two shaft-hole laminations. The truing laminations have a central truing opening with a diameter slightly larger than the shaft hole in the shaft-hole laminations, such that rotations of the truing laminations can be performed to compensate for thickness variations without an effective reduction in the diameter of the shaft hole within the rotor core. The larger diameter of the central truing opening will, in effect, compensate for the lack of concentricity during rotation of the truing laminas.

FIG. 4 illustrates a rotor core 32 formed in accordance with the present invention. The rotor core 32 comprises a stack of laminations 32 including a first group 34 of standard laminations 35 disposed on the bottom of the stack 32, a second group 36 of standard laminations 35 disposed on top of the stack 32, and a group 38 of truing laminations 40 disposed between the first and second groups 34,36 of standard laminations 35. In the rotor core 32 shown, all of the standard laminations 35 have a central opening or shaft hole 42 of the same size. The truing laminations 40 each include a central truing opening 44 which is slightly larger than the shaft hole 42. In the preferred embodiment, the central truing opening 44 is approximately 0.0020 of an inch larger in diameter than the shaft hole 42. The size of the central truing opening 44 can be adjusted depending on the degree of concentricity error, $E_c$, encountered in the manufacturing process. In accordance with the invention, a compensating rotation is applied to at least one, if not all, of the truing laminations 40 to thereby compensate for thickness variations without reducing the effective diameter of the shaft hole 42 throughout the lamina stack. In the embodiment shown, each truing lamina 40 is rotated 180° with respect to the standard laminations 35.

Figure 5:
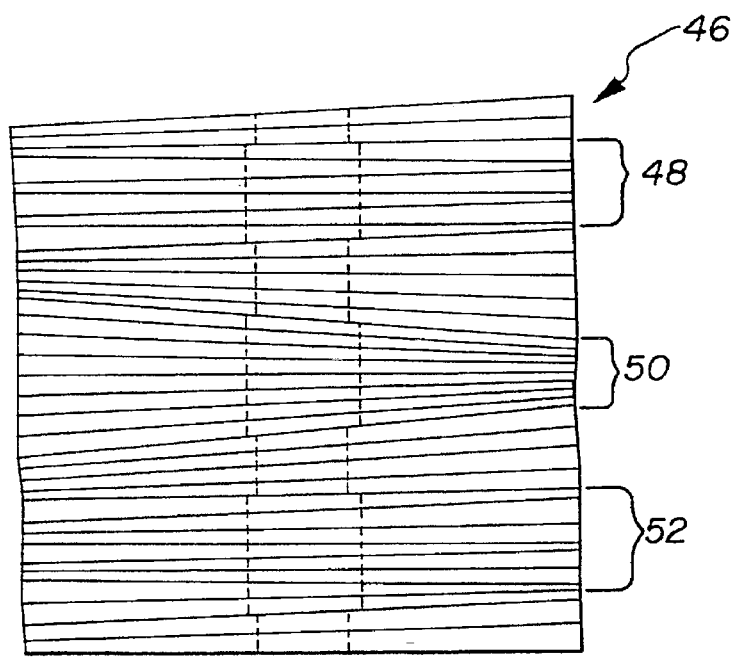
FIG. 5 shows a second embodiment of a rotor core manufactured in accordance with the present invention.

FIG. 5 illustrates a second embodiment of a rotor core 46 constructed in accordance with this invention. The rotor core 46 includes three separate groups 48,50,52 of truing laminations 40 dispersed throughout the rotor core 46. Each group 48,50,52 of truing laminas 40 is shown in a varying rotational arrangement to illustrate the options available for rotating the truing laminas 40. In the first group 48 of truing laminas 40, every other truing lamina 40 is rotated by 180° such that the thickness variations within the first group 48 will be canceled out but the thickness variations in the standard laminas 35 will not otherwise be compensated for. In the second group 50 of truing laminas 40, all of the truing laminas 40 are rotated by 180° with respect to the standard laminas 35 to thereby offset the thickness variations in a like number of standard laminations 35. In the third group 52 of truing laminas 40 the laminas 40 are rotated at various intervals.

The arrangements shown in the first and third groups are not optimal because they will not compensate for any thickness variations in the standard laminas 35 but will merely ensure that the truing laminas do not add to the parallelism error. However, the arrangement shown in the first and third groups will still provide a net reduction in the parallelism error compared to a rotor core in which no laminas are rotated. Obviously, the arrangement shown in the second group is optimal as the truing laminas 40 offset the thickness variations in a like number of standard laminas 35.

Figure 6:
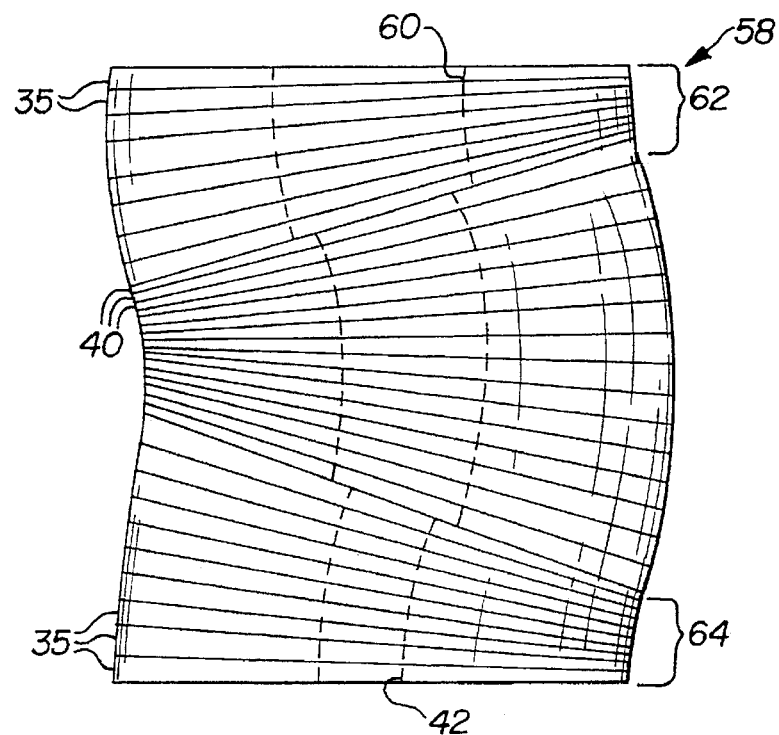
FIG. 6 shows a cross section of a third embodiment of a rotor core manufactured in accordance with the present invention.

As shown in FIG. 6, a rotor core 58 of the present invention can also include standard laminas 35 having a counterbore opening 60 through the center thereof with a diameter significantly larger than the shaft hole 42 diameter. Specifically, a first group of standard laminas, or counterbore laminas 62, includes a first central opening or counterbore 60 and a second group of standard laminas 64, or shaft hole laminas, includes a second central opening or shaft hole 42. The truing laminas can be placed within either the first or second group of standard laminations 62,64. In other words, the truing laminas can be placed within the shaft hole segment 64 of the rotor core 58 or the counterbore segment 62 of the rotor core 58. Alternatively, as shown in FIG. 6, the truing laminas 40 can be placed at the juncture between the shaft hole and counterbore groups 64,62 of the rotor core 58. In all other respects, the rotor core 58 of FIG. 6 and the truing laminas 40 therein would be utilized in similar fashion as the embodiments discussed previously with respect to FIGS. 4 and 5.

Apparatus for carrying out the preferred embodiment of the invention will now be described with reference to FIGS. 7-9.

Figure 7:
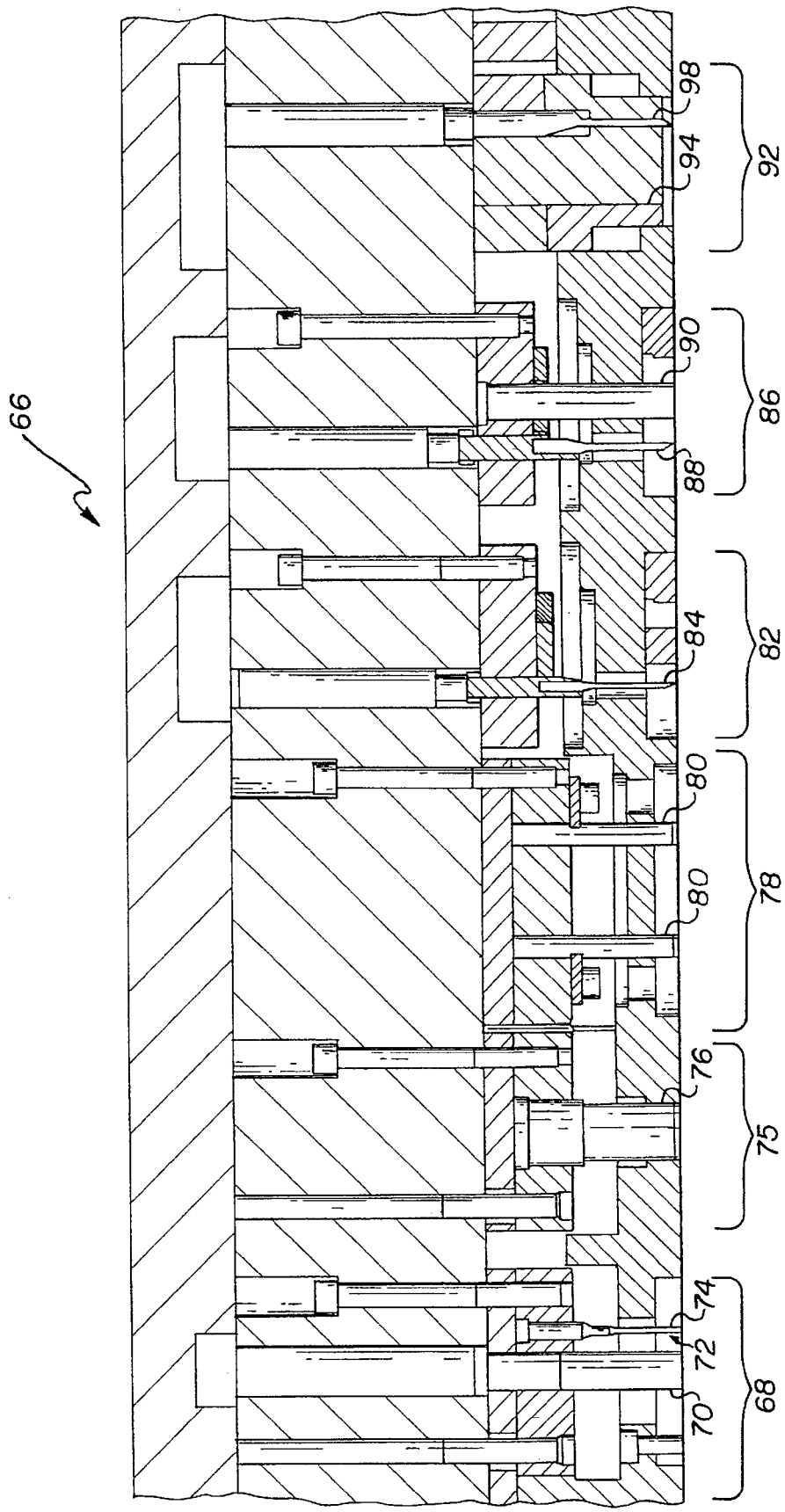
FIG. 7 is a cross-sectional view of an upper portion of the die assembly of the present invention.

In FIG. 7, a cross-sectional view of the upper portion of a die assembly 66 for manufacturing rotor cores in accordance with the present invention is shown. The die 66 includes six stations for performing a plurality of successive operations upon rotor laminas 35,40 as they are being stamped from a continuous strip of sheet metal (not shown). At the first station 68, a truing hole punch 70 is provided for punching a central truing opening 44 through each truing lamina 40. The truing hole punch 70 is preferably a pneumatically controlled, cammed truing punch 70 although other similar structures could be contemplated. A second die member 72 includes four punches 74 for establishing four small holes radially disposed about the center of each rotor lamination 35,40 coinciding with four interlock members 18 to be formed at a later station in the die assembly 66.

At the second station 75 a second central punch or counterbore die punch 76 is provided for establishing a second central opening 60 or counterbore opening through selected standard laminations 35. The standard laminations 35 with counterbore openings 60 are also simply referred to as counterbore laminations 62. In the preferred embodiment, the truing hole punch 70 pierces a smaller central truing opening 44 through the laminas 40 than the counterbore die punch 76. However, if the truing laminas were located within the counterbore portion of a rotor core 58, the truing hole punch 70 would pierce a larger central truing opening 44 than the counterbore die punch 76.

At the third station 78 of the die assembly 66, a plurality of tear-drop shaped die punches 80 provides a plurality of tear-drop shaped openings 12 about the outer periphery 14 of each rotor lamination 35,40. The purpose of these tear-drop shaped openings 12 is well-known in the rotor core art and need not be discussed here.

At the fourth station 82 of the die assembly 66, four end-lamination interlock punches 84 are provided for punching four rectangular, slightly arcuate openings through the lower most rotor lamination in each rotor core. In other words, the end lamination punches 84 provide openings which cooperate with interlock tabs 18 in the adjacent lamina in the rotor core.

At the fifth station 86, four interlock die punches 88 are provided for creating four rectangular, slightly arcuate interlock tabs 18 in each rotor lamination 35,40 (except the end lamination) adjacent the four circular openings punched at the first station 68 of the die assembly 66. Each interlock tab 18 remains attached to the rotor lamination 35,40 along one edge thereof as shown in FIG. 1, and the tabs 18 can be bent to depend downwardly from each rotor lamination 35,40 into contact with adjacent laminations 35,40 in the lamina stack. In addition, a first central punch or shaft hole die punch 90 is provided for punching a first central opening or shaft hole 42 through selected standard laminations 35 for the rotor core. The standard laminations 35 including the shaft holes 42 are referred to simply as shaft hole laminations. The shaft holes 42 are smaller than both the central truing openings 44 in the truing laminas 40 and the counterbore holes 60 in the counterbore laminas 62.

Figure 9:
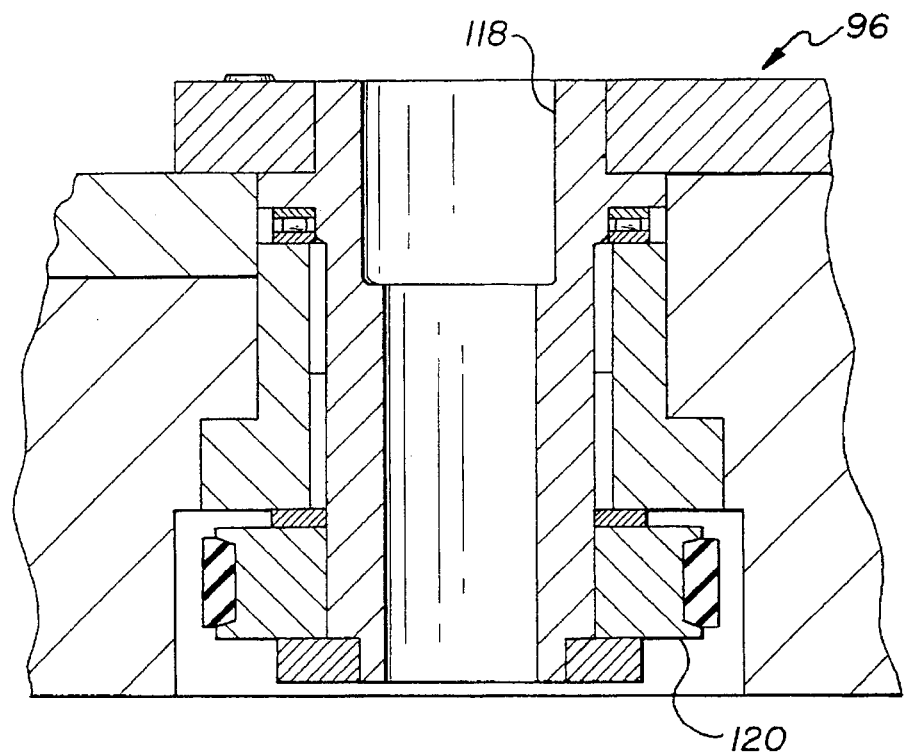
FIG. 9 is a cross-sectional view of the rotation assembly of the die of the present invention.

Finally, at the sixth station 92, a blanking punch 94 is provided for blanking the circular standard laminas 35 and truing laminations 40 from the continuous strip of sheet metal and for placing the rotor laminations 35,40 in an interference fit within a lamina holder or die barrel 96 shown in FIG. 9. In addition, four engaging die punches 98 are provided for depressing the four interlock tabs 18 in each lamina 35,40 into engagement with adjacent laminas 35,40 in the lamina stack. As each interlock tab 12 is punched into the rotor lamination 35,40 immediately below in the stack, a space is created within which the interlock tabs of the lamination 35,40 immediately above in the rotor core can be placed. Because the end lamination has no laminations beneath it in the stack, the interlock tabs 12 are removed at the fourth station 82 leaving simply an empty space for receiving the interlock tabs 12 from the lamina immediately above in the lamina stack.

Figure 8:
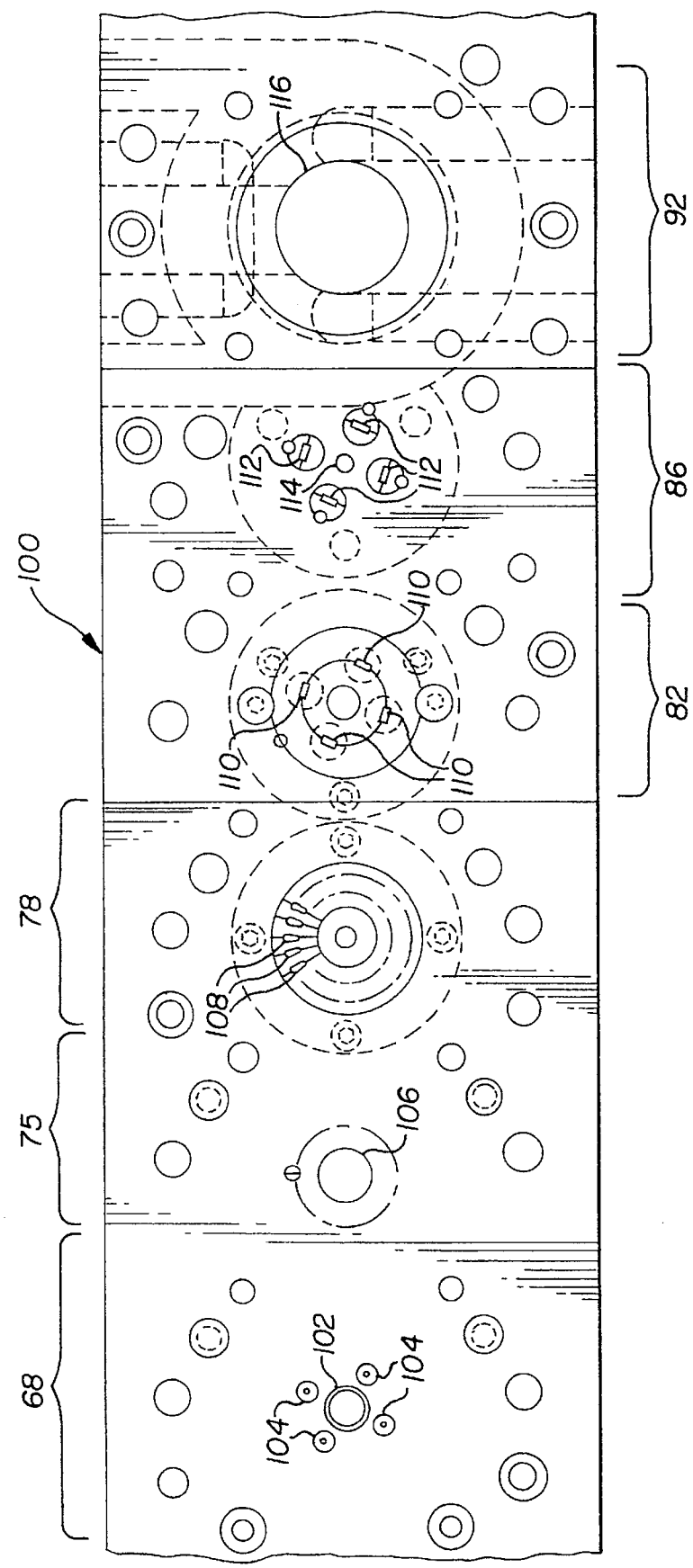
FIG. 8 shows the lower portion of the die assembly of the present invention.

FIG. 8 shows a top-down view of a lower portion 100 of the die assembly illustrating openings corresponding to the die punches shown in FIG. 7 for receiving the die punches during stamping of the rotor laminations 35,40. Thus, at the first station 68 a truing punch die button 106 is provided as well as four circular openings 104 for receiving the corresponding die punches 70,74. At the second station 75, a counterbore opening 106 is provided for receiving the counterbore punch 76. At the third station 78, a plurality of tear-drop shaped openings 108 are provided for receiving the tear-drop shaped punches 80. At the fourth station 84, four rectangular, slightly arcuate openings 140 are provided for receiving the end lamination interlock punches 84. At the fifth station, four rectangular, slightly arcuate openings 112 identical to those at the fourth station 82 are provided for receiving the four interlock punches 88. In addition, a central opening 114 is provided for receiving the shaft hole punch 90. Finally, at the sixth station 92, a top opening 116 for the die barrel 96 is shown for receiving and stacking the blanked laminas therein.

FIG. 9 shows a cross-sectional view of the die barrel assembly 96 including a lamina holding chamber 118 and a sprocket 120 for receiving a poly-chain joining the die barrel to a motor assembly (not shown). In operation, actuation of the motor assembly will provide a corresponding movement in the chain which will, accordingly, induce rotation in the die barrel. By controlling the motor and, thus, the die barrel, selected rotation and/or skewing can be provided to any lamina within the lamina stack.

The method of the present invention will now be described in greater detail. In operation, the method contemplates blanking a plurality of standard laminas 35 from a sheet metal strip and punching a first central opening or shaft hole 42 through at least a first standard lamina. Preferably, a plurality of such shaft hole laminas 64 are provided. Further, at least a second standard lamina 35 is punched from the sheet metal strip including a second central opening. At least one truing lamina 40 is punched from the sheet metal strip including a central truing opening 44 therethrough wherein the defined area of the central truing opening 44 is greater than the defined area of the first central opening or shaft hole 42 in the first standard lamina 35 and is unequal to the defined area of the second central opening in the second standard lamina 35. In the preferred embodiment, the truing lamina or laminas 40 would be disposed between two groups 64 of shaft hole laminas and thus the central truing opening 44 would be larger than the central openings 42 in the first standard lamina 35 and accompanying standard laminas 35 in the first group 64 above the truing lamina 40, and the second central opening 42 in the second standard lamina 35 and accompanying standard laminas 35 in the second group 64 below the truing lamina 40. In other words, the truing laminas are disposed between opposing groups 64 of shaft hole laminas in the preferred embodiment or, in an alternative embodiment, between opposing groups of counterbore laminations 62 or at the juncture between groups of shaft-hole laminas 64 and counterbore laminas 62.

The laminas are stacked together, and each standard lamina 35 is stacked such that it has a uniform rotational relationship with respect to adjacent standard laminas 35 in the lamina stack. In other words, the standard laminas 35 could all be stacked such that each has an identical orientation with respect to the stack. On the other hand, each lamination in the stack can be provided with a small skew angle. A compensating rotation is provided to at least a first truing lamina 40 with respect to the preceding lamina in the lamina stack such that the first truing lamina 40 has a rotational relationship with the preceding lamina greater than the uniform rotational relationship between adjacent standard laminas 35 to compensate for lamina thickness variations. In other words, at least one compensating rotation is provided to the first truing lamina 40, if not to each truing lamina 40, which is in addition to any skew angle rotation provided to the lamina stack. In the preferred embodiment, the compensating rotation would be a large angle, such as 45°, 90°, or 180°, to place any thickness variations in the truing laminas in position to offset the accumulation of thickness deviations among the standard laminas 35 in the stack.

To secure the laminas 35,40 together in the stack and thereby form a completed rotor core, the laminas 35,40 are also interlocked using the previously described interlock tabs 18. Thus, any compensating rotations of the truing laminas 40 are limited by the number of interlock tabs 18 disposed in the laminations 35,40 because the interlock tabs 18 of adjacent laminas must be aligned. In other words, if four interlock tabs are provided in the laminations, compensating rotations in increments of 90° must be provided to enable the laminas to interlock together. Thus, the compensating rotations are equal to a multiple of 360° divided by the number of interlock tabs. In contrast, the skew angle of rotation must be small enough that the interlock tabs 18 will only be offset slightly from each other in the lamina stack. Thus, a skew angle of rotation between adjacent laminas 35,40 of even less than 1° could be contemplated.

The invention can also be described with respect to the operations performed by the die 66 during the stacking and stamping process of forming the rotor cores. The method is similar to the method previously discussed including the steps of blanking a plurality of standard laminas 35 from the sheet metal strip, punching a first central opening or shaft hole 42 through at least a first standard lamina 35 and punching a second central opening through at least a second standard lamina 35. A group of truing laminas 40 are blanked from the sheet metal strip including at least a first truing lamina 40 which has a central truing opening 44 therethrough with a defined area greater than the defined area of the first central opening 42 in the first standard lamina 35 and unequal to the defined area of the second central opening in the second standard lamina 35.

In the preferred embodiment, a plurality of truing laminas 40 would be disposed between adjacent groups of shaft hole laminations 64 such that the diameter of the central truing openings 44 in each of the truing laminas 40 would be greater than the shaft hole openings 42 in each of the standard laminas 35. However, in alternative embodiments, the group of truing laminas 40 could be disposed between adjacent groups of counterbore laminations 62 or at the juncture between groups of shaft hole laminations 64 and counterbore laminations 62. In the latter case, if the truing laminas 40 were disposed within the shaft hole portion 64 of the rotor core, the diameter of the central truing opening 44 would be greater than the shaft hole opening 42 of the shaft hole laminas 64 and smaller than the counterbore opening 60 in the counterbore laminas 62. However, if the truing laminas 40 were disposed within the counterbore portion of the rotor core, the diameter of the central truing opening 44 would be greater than both the counterbore opening 60 in the counterbore laminas 62 and the shaft hole opening 42 in the shaft hole laminas 64.

The first standard lamina 35 is placed upon a lamina holder 96, and the group of truing laminas 40 is then stacked on the lamina holder 96 above and immediately adjacent the first standard lamina 35. Next, the second standard lamina 35 is stacked on the lamina holder 96 above and immediately adjacent the group of truing laminas 40. In the preferred embodiment, a plurality of shaft hole laminas 64 would first be placed on the lamina holder. A plurality of truing laminas 40 followed by a plurality of shaft hole laminas above the group of truing laminas 40 would then be placed on the lamina holder 96.

Next, the method contemplates providing a plurality of compensating rotations to the lamina holder 96 after placing the first standard lamina 35 on the lamina holder 96 and before placing the second standard lamina 35 on the lamina holder 96. The sum of the compensating rotations is equal to a multiple of 360° to compensate for lamina thickness variations while preventing the compensating rotations of the lamina holder 96 from affecting the relative angular positions of the first standard lamina 35 and the second standard lamina 35. In other words, the lamina holder 96 is rotated at least twice during the time period before the first truing lamina 40 is placed on the lamina holder 96 and after the last truing lamina 40 is placed on the lamina holder 96. For example, the lamina holder could be rotated by 180° immediately after the first standard lamina 35 is placed on the lamina holder 96 and then rotated another 180° after the last truing lamina 40 is placed on the lamina holder 96. In this preferred arrangement, the truing laminas 40 would provide the greatest compensating effect of the lamina thickness variations as each truing lamina 40 would offset the thickness variations in one of the standard laminas 35 in the lamina stack. Alternatively, the lamina holder 96 could be rotated 180° after each truing lamina 40 is placed on the lamina stack such that the truing laminas 40 alternate their orientations with respect to the lamina stack. This arrangement would be less desirable because the truing laminas 40 as a group would have no parallelism problems but would not otherwise offset the thickness variation problems associated with the other standard laminas 35. Further, a third alternative arrangement would involve rotating the lamina holder by another increment, such as 90°, after placement of each truing lamina 40 on the lamina stack.

The compensating rotations must equal 360° in order to return the standard laminas 35 below the group of truing laminas 40 to their original orientation (except for any skew angle rotation). Otherwise, if the lamina holder were rotated by a different total amount, such as 270°, each of the standard laminations 35 below the group of truing laminations 40 would be rotated by 90° with respect to each of the standard laminas 35 placed above the group of truing laminas 40. As such, the central openings 42,60 through the standard laminas 35 would not be aligned if any concentricity problems exist in the laminas. The effectiveness of the invention would be thereby reduced or eliminated.

The method also contemplates relatively rotating the lamina holder 96 after placement of each lamina on the lamina holder 96 by a pre-determined skew angle in addition to any compensating rotation of the lamina holder 96. In other words, in the preferred embodiment, a small skew angle would be provided to each lamina 35,40 in the lamina stack. Although it is not contemplated, the lamina holder 96 could also be rotated by a desired skew angle with respect to only certain laminas 35,40 in the lamina stack, such as every second or third lamina. Finally, each lamina 35,40 in the lamina stack is interlocked to fix and form the relative rotational positions of the laminas and form a solid rotor core.

To carry out the method of the present invention, a controller (not shown) is provided for directing the die to stack first and second standard laminas 35 on opposite ends of a group of truing laminas 40 on the lamina holder 96 and for directing the lamina holder 96 to perform a plurality of compensating rotations after the first standard lamina 35 is placed on the lamina holder 96 and before the second standard lamina 35 is placed on the lamina holder 96 to compensate for lamina thickness variations. The controller ensures that the sum of all the compensating rotations is equal to a multiple of 360°, and that the relative rotational positions of the first and second standard laminas 35 are unaffected by the compensating rotations. In other words, the controller provided in the die 66 of the present invention would accomplish the method described above in which compensating rotations are provided to the truing laminas 40 to compensate for thickness variations while avoiding problems due to lack of concentricity of the center openings within each lamina.

The controller can also operate to provide a desired skew angle rotation between laminas 35,40 within the lamina stack. In other words, the controller can provide a skew angle to each lamina 35,40 in the stack in addition to any compensating rotation provided by the controller to the truing laminas 40. Alternatively, as mentioned previously, the controller could provide skewing rotation to only a selected interval of laminas 35,40 throughout the stack such as every second or third lamina.

Although the description of this invention has been given with reference to a particular embodiment, it is not to be construed within a limiting sense. Many variations and modifications will no doubt occur to those skilled in the art. For a definition of the invention, reference is made to the appended claims.

What is claimed is:

1. A method of manufacturing laminated components from a plurality of laminas stamped out of successive regions of a sheet metal strip, said method comprising the steps of:

blanking a plurality of standard laminas from the sheet metal strip;

punching a first central opening having a defined area through a first standard lamina;

punching a second central opening having a defined area through a second standard lamina;

blanking a first truing lamina from the sheet metal strip;

punching a central truing opening through the first truing lamina having a defined area greater than the defined area of the first central opening in the first standard lamina and unequal to the defined area of the second central opening in the second standard lamina;

stacking each standard lamina and truing lamina together in a lamina stack such that each standard lamina has a uniform rotational relationship with respect to adjacent standard laminas in the lamina stack;

positioning the first truing lamina between the first and second standard laminas in the lamina stack; and providing a compensating rotation to the first truing lamina with respect to an immediately preceding lamina in the lamina stack such that the first truing lamina has a rotational relationship with the preceding lamina greater than the uniform rotational relationship between adjacent standard laminas to compensate for lamina thickness variations.

2. The method of claim 1 including the steps of:

imparting a predetermined skew angle rotation between every adjacent lamina in the lamina stack; and providing the compensating rotation to the first truing lamina in addition to the skew angle rotation.

3. The method of claim 1 including the step of punching the second central opening in the second standard lamina to a size equal to the first central opening in the first standard lamina.

4. The method of claim 1 including the step of punching the second central opening in the second standard lamina to a size greater than the first central opening in the first standard lamina and greater than the central truing opening in the first truing lamina.

5. The method of claim 1 including the step of punching the second central opening in the second standard lamina to a size smaller than the first central opening in the first standard lamina.

6. The method of claim 1 including the step of interlocking adjacent laminas in the lamina stack.

7. A method of manufacturing laminated components from a plurality of laminas stamped out of successive regions of a sheet metal strip, said method comprising the steps of:

blanking a plurality of standard laminas from the sheet metal strip;

punching a first central opening having a defined area through a first standard lamina;

punching a second central opening having a defined area through a second standard lamina;

blanking a group of truing laminas from the sheet metal strip including at least a first truing lamina;

punching a central truing opening through each truing lamina having a defined area greater than the defined area of the first central opening in the first standard lamina and unequal to the defined area of the second central opening in the second standard lamina;

placing the first standard lamina on a lamina holder;

stacking the group of truing laminas on the lamina holder above and immediately adjacent the first standard lamina;

stacking the second standard lamina on the lamina holder above and immediately adjacent the group of truing laminas; and providing a plurality of compensating rotations of the lamina holder after placing the first standard lamina on the lamina holder and before placing the second standard lamina on the lamina holder such that the sum of the compensating rotations is equal to a multiple of 360 degrees to compensate for lamina thickness variations without affecting the relative angular positions of the first and second standard laminas.

8. The method of claim 7 including the step of relatively rotating the lamina holder after placement of each lamina on the lamina holder by a predetermined skew angle in addition to any compensating rotation provided by the lamina holder.

9. The method of claim 7 including the step of punching the second central opening in the second standard lamina to a size equal to the first central opening in the first standard lamina.

10. The method of claim 7 including the step of punching the second central opening in the second standard lamina to a size greater than the first central opening in the first standard lamina and greater than the central truing opening in the first truing lamina.

11. The method of claim 7 including the step of punching the second central opening in the second standard lamina to a size smaller than the first central opening in the first standard lamina.

12. The method of claim 7 including the step of interlocking adjacent laminas in the lamina stack.

* * * * *